United States Patent Office 3,045,842
Patented July 24, 1962

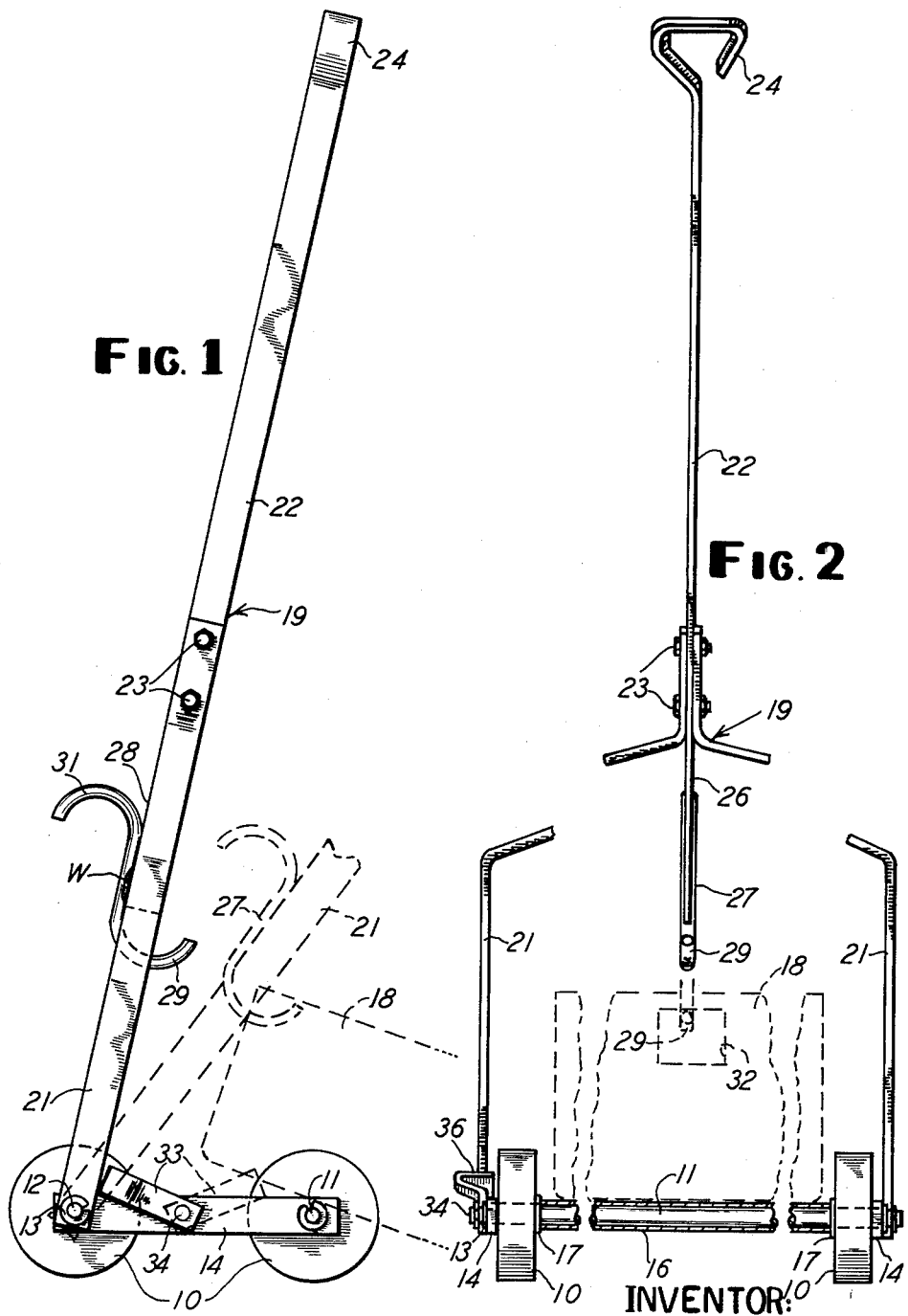

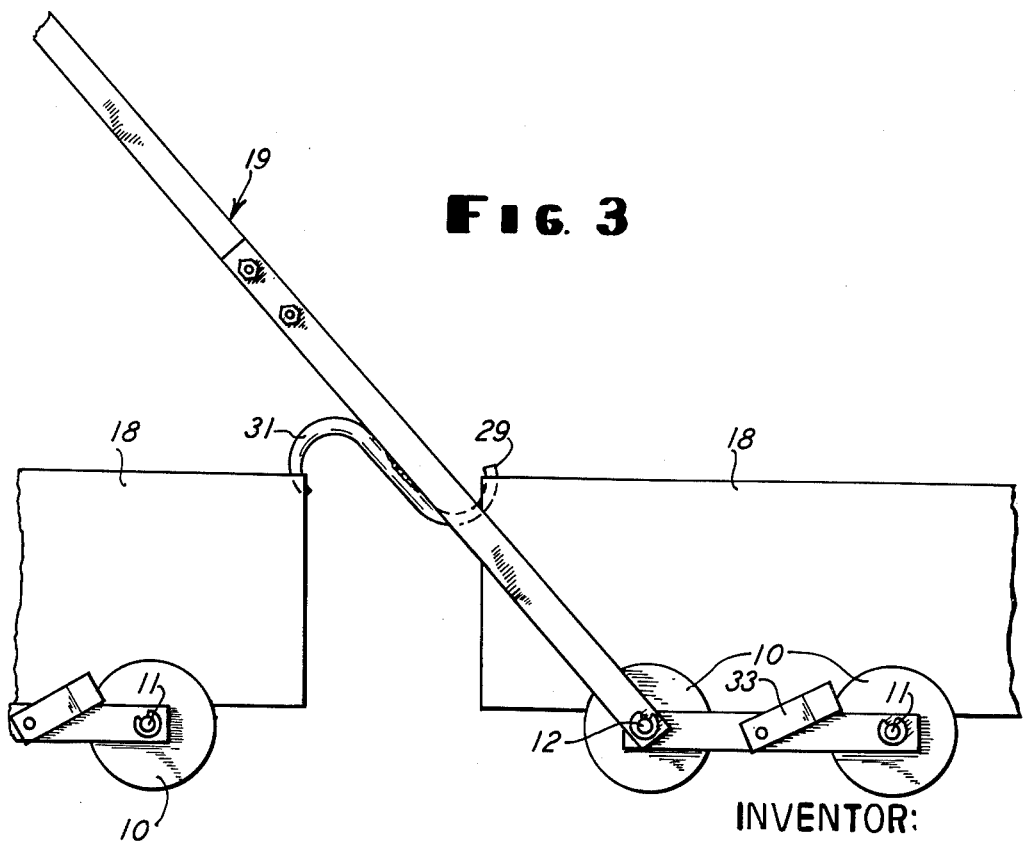

3,045,842
HAND TRUCK
Victor F. Vinkavich, 1504 Park Ave., Racine, Wis.
Filed Feb. 28, 1961, Ser. No. 92,204
3 Claims. (Cl. 214—84)

This invention relates to a hand truck or shop pan carrier of the type generally employed for both lifting and transporting articles.

It is an object of this invention to provide an improved hand truck of the type employed in the factory or shop for transporting various parts and articles in a shop pan from one station or machine to another.

More specifically, it is an object of this invention to provide a simplified but improved carrier of the type mentioned, and wherein the carrier is sturdy, easily maneuverable, simple in its operation in both picking up and transporting the desired article, and which is simplified and therefore inexpensive in its manufacture, and still further it does not require considerable space for storing between moments of using same.

A more specific object of this invention is to provide a shop pan carrier which has means thereon for readily placing the carrier in the inoperative position, but with this position being one which renders the carrier readily accessible and convenient for subsequent use.

Still another object of this invention is to provide a shop pan carrier which can be easily joined in gangs of two carriers so that one operator can readily maneuver the two carriers and thus a double load from one position to another within a shop or the like.

Still another object of this invention is to provide a shop pan carrier which can be readily assembled and folded in a nearly completed assembled position, so that in the folded position the carrier occupies a minimum of space for the purpose of storage and boxing for shipping or the like.

Other objects and advantages will become apparent upon reading the following description in light of the accompanying drawings wherein:

FIG. 1 is a side elevational view of a preferred embodiment of this invention, and with the dotted lines showing the device in one operative position.

FIG. 2 is a front elevational view of a broken-away showing of the device of FIG. 1 and showing the shop pan and parts of the device in dotted positions.

FIG. 3 is a side elevational view showing fragments of two devices and two pans hooked together.

The same reference numerals refer to the same parts between the two views. The drawings show a shop pan carrier for hand truck to consist of four wheels, three of which are shown and are generally designated 10, and these wheels are of course the front and rear wheels with an axle 11 serving as the front axle and an axle 12 serving as the rear axle and with conventional snap rings 13 engaging the opposite ends of the respective axles for securing the assembly in the manner described hereinafter.

Side members or connectors 14 extend between the front and rear wheels and they are pivotally connected to the respective ends of the axles 11 and 12 and of course are secured thereon by the snap rings 13. To complete the construction of the chassis or wheel and axle set, sleeves or pipes 16 are relatively loosely disposed over the two axles 11 and 12 and the sleeves extend between the pairs of wheels 10 to abut washers 17 disposed just inside the wheels 10. Thus, the sleeves 16 space the wheels apart, and the sleeves also serve to rollably support the shop pan or load generally designated 18 and shown in dotted lines. Of course the pan 18 is rollably supported when it is pulled over the sleeves 16, and the latter therefore make it easy for mounting the pan 18 onto the chassis described.

A handle, generally designated 19, is pivotally mounted on the rear axle 12 by extending thereover in two sections 21 which are shown to extend between the side members 14 and the snap rings 13. Of course the sections 21 form a bifurcation of the handle 19 and they are disposed to permit adequate space for movement and positioning of the pan 18 on top of the sleeves 16 as indicated. Here, it will also be noted that the upper end 22 of the handle 19 is secured to the bifurcation 21 by means of the bolts 23. The handle portion 22 is formed at 24 to provide a hand grip for manipulation of the carrier. Also, the lower end 26 of the portion 22 extends between the bifurcation 21 and supports a pan engager or reverse hook member 27, which is preferably welded to the rear surface or edge 28 at weld indicated W, of the extending end 26. The member 27 has a lower and forwardly disposed first hook 29 and an upper and rearwardly disposed second hook 31, and both of the hooks 29 and 31 project in the direction transverse to the axles 11 and 12.

Thus it will of course be understood that the handle 19 can be pivoted to a forward position, such as shown by the dotted lines in FIGS. 1 and 2, and then the front hook 29 can be engaged in an opening 32 existing in the conventional shop pan 18. Then upon retracting the handle 19 in a counter-clockwise direction as viewed in FIG. 1, the pan 18 will be raised off its position on the floor and it will be raised up to the position shown in FIG. 1, and continued pivotal movement of the handle 19 will of course position the pan 18 fully upon both of the sleeves 16.

At this time it will also be understood and noted in FIG. 3 that an identical truck or carrier can be provided so that upon centering the pan 18 on the shown truck, the other carrier can be attached to the pan by the connection of the hook 31 to the pan 18 after of course the hook 29 of the trailing carrier has been attached to its pan. In this manner, the member 27 with its double hooks 29 and 31 permits the operator to move a double pay load or two pans 18 in one trip by simply hooking one carrier to another as described. Then the unshown handle of the truck on the left in FIG. 3 can be pulled to move both trucks and their pans.

It will also be noted that a stop 33 is pivotally mounted on one of the side members 14 by means of a shaft or rivet 34 and the stop extends beyond the rivet 34 in a transverse end 36. The end 36 therefore presents an abutment for the handle 19 when the latter is swung clockwise and the stop 33 is in the position shown in FIG. 1. This permits of course the handle to be left in the inoperative position and the carrier will not occupy more floor space than required by the span of the wheels 10. Also the stop 33 can be readily swung to the inoperative position as shown by the dotted lines in FIG. 1 and the handles 19 can then be pivoted clockwise as shown by the dotted lines in FIG. 1 for the purpose of attaching to the pan 18 as desired. In the construction of the stop 33, it will be noted that the end 36 projects a substantial distance laterally of the carrier so that the operator's foot can be readily used for pivoting the stop 33 between the solid line and dotted line positions shown.

The carrier is also conducive to folding into an extremely compact, but yet virtually fully-assembled position, in that the bifurcations 21 can be pivoted counter-clockwise about the axle 12 approximately three-quarters of the way around below the wheels 10 and the members 14. Then, upon removal of, for instance, the lower bolt 23, the upper handle portion 22 can be folded with respect to the bifurcations 21 so that the handle can be folded back upon itself and the entire carrier will therefore occupy only a very small space for the purpose of boxing or storing. This particular feature is found to be in distinct contrast to the carriers heretofore known in that most of them are extremely cumbersome and bulky although they do not perform all of the functions which are possible with the carrier described in the foregoing.

While a specific embodiment of this invention has been shown and described, it will be understood that certain changes could be made therein and the invention therefore should be limited only by the scope of the appended claims.

What is claimed is:

1. A shop pan carrier comprising a set of front and rear wheels and two axles extending respectively between said front and rear wheels, a sleeve rotatably mounted on said axles and extending between respective pairs of said wheels for spacing the same apart and for rollably supporting a shop pan thereon when the latter is moved over said sleeves, side members pivotally attached between said axles for pivotally connecting the same together, a handle pivotally connected to one of said axles and extending thereabove, a pan-engaging member attached to said handle at a location thereon spaced above said axles and including two hooks thereon faced oriented to be oppositely directed and transverse to said axles for each engaging a shop pan upon opposite pivotal movement of said handle, and a stop movably mounted on one of said side members and extending to said handle for supporting the latter in an over-center position toward the other of said axles in one position of said stop.

2. A hand truck of the type including a chassis consisting of a set of front and rear wheels and two axles extending respectively between said front and rear wheels and including a handle pivotally attached to said chassis, comprising a sleeve rotatably mounted on said axles and extending between respective pairs of said wheels for spacing the same apart and for rollably supporting a shop pan thereon when the latter is moved over said sleeves, a pan engaging member attached to said handle at a location thereon spaced above said axles and including two hooks thereon faced oriented to be oppositely directed and transverse to said axles for each engaging a shop pan upon opposite pivotal movement of said handle, and a stop movably mounted on said chassis and extending to said handle for supporting the latter in an over-center position of non-use.

3. A hand truck of the type including a chassis consisting of a set of front and rear wheels and two axles extending respectively between said front and rear wheels, comprising a handle pivotally attached to said chassis and extending thereabove and being bifurcated at the lower end of said handle and being spaced over said chassis, said handle consisting of an upper end extending in a portion between the bifurcation and into the space, and a pan-engaging member attached to said portion and including two oppositely faced hooks for attaching to a pan with each of said hooks upon opposite pivotal movement of said handle.

References Cited in the file of this patent

UNITED STATES PATENTS

| | | |
|---|---|---|
| 1,424,528 | Squire | Aug. 1, 1922 |
| 1,924,885 | Schreck | Aug. 29, 1933 |
| 2,371,811 | Ericsson | Mar. 20, 1945 |
| 2,417,644 | Graham | Mar. 18, 1947 |
| 2,707,055 | Ellis | Apr. 26, 1955 |
| 2,966,365 | Kortum | Dec. 27, 1960 |